CR 3,048,822
55-2
55-3
RSD
SEARCH ROOM

MULTIPLE STATION RECORDING SYSTEM

Filed April 28, 1958

INVENTOR.
KARL R. WENDT
BY Lyon & Lyon
ATTORNEYS 3,048,822
Patented Aug. 7, 1962

3,048,822

MULTIPLE STATION RECORDING SYSTEM

Karl R. Wendt, Santa Monica, Calif., assignor, by mesne assignments, to Paramount Pictures Corporation, New York, N.Y., a corporation of New York Filed Apr. 28, 1958, Ser. No. 731,288
3 Claims. (Cl. 340—167)

Figure 1:
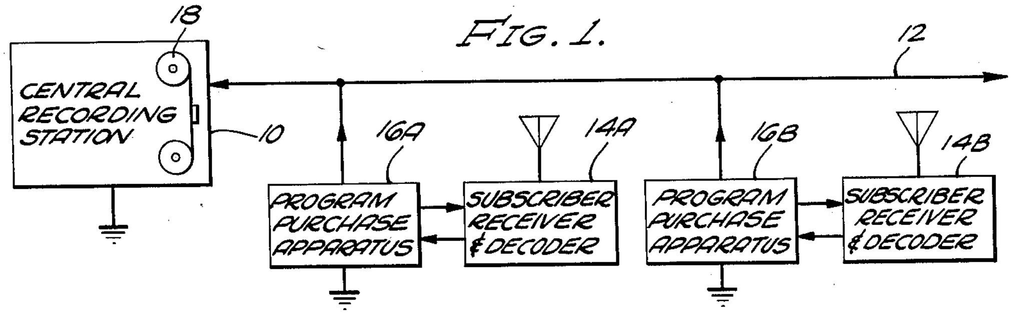

This invention relates to subscription television systems and, more particularly, to an improved arrangement for recording the purchase of a program by subscribers.

A number of different approaches have been made to the problem of collecting the cost of purchasing a program from a subscriber in a subscription television system. These have included a coinbox at each subscriber receiver which sets up the price of a program whereby a program can be purchased by depositing that price; the purchase of a coded card which is inserted into a slot in apparatus attached to a receiver for the purpose of decoding the program which has been purchased; calling the telephone company for a decoding signal thereby indicating to them that the program is being purchased, etc. A system which on the surface appears simple and yet one which has not received much consideration because of complications which can arise is one wherein a line can be run to a number of subscriber receivers at which there is apparatus which, when actuated, indicative of the purchase of a program, transmits a code on the line to a central recording station. The code will identify the purchaser of the program and the time of recording can indicate the program purchased. Such a program-purchase recording system, however, has certain basic problems. Usually the time of purchase of a program is just prior to when such program is to be transmitted. As a result, a situation arises similar to that occurring when any large number of persons simultaneously try to call a single phone number. Only the first caller gets through and the rest cannot make the call. If a mark-space code is employed for identifying a subscriber, it is possible for a subscriber to energize the purchase-indicating equipment at his receiver during the interval of the space in the code being transmitted from another subscriber. This can lead to erroneous code recordation at the central recording station.

An object of the present invention is the provision of an arrangement for enabling the recording of the program by a plurality of subscribers who are joined to a central recording station by a single line.

Another object of the present invention is the provision of an arrangement for preventing the occurrence of erroneous code recordation due to two or more subscribers simultaneously transmitting said code on a single line to a central recording station.

Yet another object of the present invention is the provision of a novel, useful, and simple subscription-television program-purchase recording system.

These and other objects of the invention are achieved by the provision of an arrangement wherein, at each subscriber receiver there is apparatus which is connected to a central recording station over a common line. Each said apparatus contains a pushbutton which is actuated whenever it is desired to buy a program. The pushbutton enables an identification-code transmitter to be energized. The output of the identification-code transmitter, consisting of such code, is applied to the common line. Also connected to this line is a circuit which, upon sensing the presence of code being transmitted from another subscriber receiver, delays the operation of the identification-code transmitter. The time this is delayed is different at each subscriber's location and is established by the setting of a potentiometer. Thus, only one code at a time will be transmitted over the line. Should a pushbutton be actuated during the space in a code being transmitted over the line, the first mark signal on the line which occurs thereafter will effectively block all other equipment which is not transmitting a mark. Such other equipment will thereafter not transmit any further code, but will cycle to the initial condition of code transmission. A suitable interval after the disappearance of code transmission on the line, this equipment will again commence a cycle of operation and code transmission.

Figure 2:
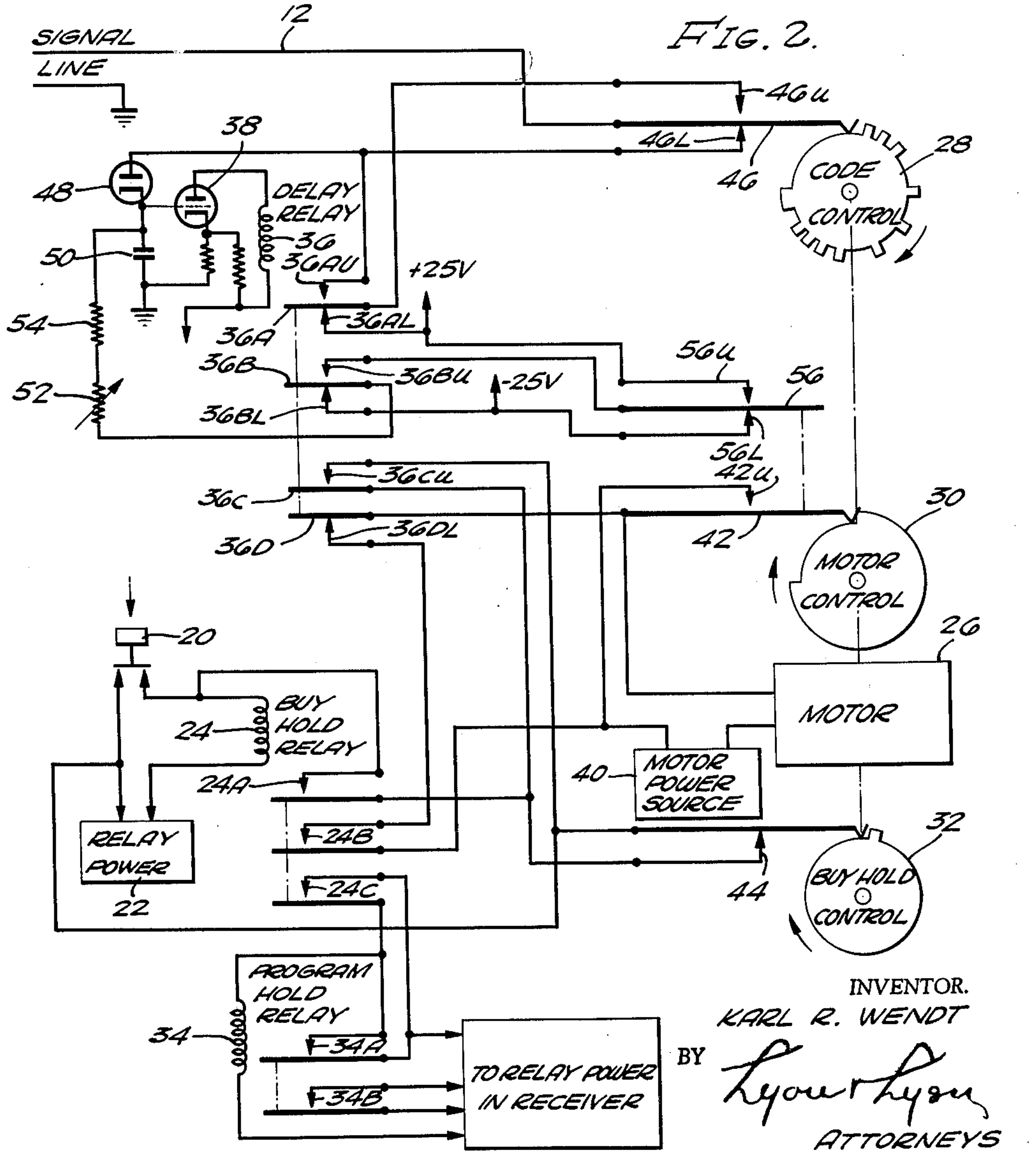

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a block diagram of a system for recording the purchase of programs in a subscription television system, in accordance with this invention; and FIGURE 2 is a circuit diagram of an embodiment of the invention located at each subscriber receiver.

Referring now to FIGURE 1, the block diagram shown therein is representative of a program-purchasing arrangement for a multiplicity of subscribers to a subscription television system who are connected to a central recording station by a common line. The central recording station 10 has a common line 12 going out to a plurality of subscribers. At each subscriber location wherein there is a subscriber receiver and decoder 14A, 14B . . . there is also placed program-purchase apparatus 16A, 16B. . . . Such program-purchase apparatus is connected to the line 12. The subscriber receiver may obtain signals, either over the air, by wire, or by a combination of both. Whichever arrangement is employed is immaterial to the program-purchase apparatus. All that is required of the subscriber receiver is that it indicate to the program-purchase apparatus the time of the termination of a purchased program, whereby such apparatus is enabled for a subsequent program purchase. The program-purchase apparatus, upon actuation of a pushbutton therein, will enable the decoder of the subscriber receiver to commence to function.

The single-wire circuit 12 is employed to connect all subscribers in parallel in a given area. A plurality of such areas may be taken care of by having a central recording station and a single wire for each one of these areas. The central recording stations, in turn, may be connected to the main station. The recording at each central recording station is performed most readily by well-known tape-recording apparatus, here represented by the reels and tape 18. This tape-recording apparatus records in sequence the codes of the various subscribers who have purchased the program on tape. The tapes may be subsequently read out to the main station through suitable telemetering arrangements. Alternative to this, the central recording station tapes may be provided with a sufficient storage capacity, so that they need only be visited periodically and the information thereon may be removed.

Reference is now made to FIGURE 2, wherein there is shown a circuit diagram of the program-purchase apparatus at each receiver. This will include a pushbutton switch 20, which is depressed when it is desired to purchase a program. The contacts of the switch 20, when closed, apply power from a relay power source 22 to the coil of a "buy-hold" relay 24. Relay 24 has three pairs of normally open contacts, respectively 24A, 24B, and 24C. Contacts 24A serve the function of maintaining the relay 24 operated until a cycle of identification code has been transmitted. Contacts 24B serve the function of energizing a motor 26, which will commence to rotate and thereby rotate three discs 28, 30, 32, which are mounted on a shaft. Contacts 24C serve the function of energizing a "program-hold" relay 34.

The relay 34 has two pairs of normally open contacts, respectively 34A and 34B. Contacts 34A serve the function of latching relay 34 in an operative position until the program which has been purchased is over. The power for operating relay 34 is derived from the subscriber receiver and is applied over contacts 24C to the relay to hold it operated over contacts 34A. The power for operating relay 34 may be provided, for example, by means of a monitoring tone transmitted from the television program transmitter for as long as the program which has been purchased is being transmitted. An arrangement for utilizing a monitoring tone for holding in a relay for the duration of a program is well known and is shown and described, for example, in a patent to Robert E. Gottfried et al., No. 2,769,026. The contacts 34B, when closed, are connected to the subscriber-receiver decoding arrangement to enable same to function.

There is also included in this invention a "delay" relay 36, the coil of which is in series with the plate of a tube 38. Therefore, whenever tube 38 is enabled to conduct current, relay 36 is operated. Relay 36 has two single-pole double-throw contact sets, one normally open and one normally closed contact pair. The single-pole double-throw contact sets include movable armatures 36A and 36B, lower contacts 36AL, 36BL, with which the movable armatures are normally closed, and normally open upper contacts 36AU and 36BU. The normally open contact pair includes the armature 36C and upper contact 36CU. The normally closed contact pair includes the armature 36D and lower contact 36DL. All the armatures are ganged to move simultaneously.

The path over which the motor 26 is operated, when contacts 24B are closed, may be traced from the motor power source 40 through contacts 24B, through contacts 36DL and 36D, which are normally closed, and then down to the motor 26. The discs driven by the motor 26 may be respectively referred to as the code disc 28, the motor-control disc 30, and the buy-hold control disc 32. The peripheries of these discs are shaped or notched to provide cam surfaces for performing various functions. When the motor has operated through approximately a 90° arc, the cam periphery of the motor-control disc 30 will move two ganged switch armatures 42, 56. The contact 42U is associated with armature 42 and together, when closed, these contacts shunt all others and connect the motor directly to its power source, whereby the motor will continue to operate through its cycle, regardless of the opened or closed conditions of contacts 36D and 36DL and contact 24B.

The relay 24 is maintained operated over its contacts 24A. The power path for this may be traced from the relay coil through the contact 24A, through the normally closed contacts of a switch 44, and thereafter back to the source of relay power 22. The armature of switch 44 is in camming contact with the periphery of the buy-hold control disc 32. When this disc has rotated substantially through one revolution, the cam elevation on its surface will open the switch 44, thereby releasing the relay 24.

The code disc 28 has its periphery shaped to have cam elevations representative of the identification code of the subscriber. A switch 46 has its armature in camming contact with the periphery of the disc. Wherever there are no elevations on the surface of the disc, the armature 46 will be closed to its lower contact 46L. Whenever an elevation occurs, the armature 46 will be closed to its upper contact 46U. The signal line 12, itself, is connected to the armature 46. The upper contact 46U is connected to a +25 volt source of energizing potential over the normally closed contacts 36A and 36AL of relay 36. Accordingly, as the code disc rotates, when there is no cam elevation, then the arm 46 is closed to its contact 46L and the line 12 is connected to a diode 48. Wherever a cam elevation appears, then the arm 46 is raised to make contact with the contact 46U, whereby the potential is applied to the line 12. From this it should be apparent that whatever identification code is desired to be transmitted is determined by the cam elevations, as well as the spacing therebetween on the code disc 28. The code is a mark-space code.

When the disc starts to rotate after substantially 90° of arc, the first protuberance on the disc causes a long pulse to be sent on the signal line 12 to the central recording station. This long pulse is employed to signal the central recording station that a recording operation is about to be performed and the tape-recording equipment should be placed into operation. Thereafter, the periphery of the disc is formed to provide a desired mark-space pulse transmission on the signal line which identifies the purchase by the subscriber.

In the event, at the time the pushbutton 20 is actuated, a code transmission is occurring on the signal line, then this will be detected during the time that the code disc is rotating between its starting position and the first cam elevation. During that time, the armature 46 is connected to 46L, the lower contact, and the pulse on the signal line will be applied through a diode 48 to charge up a capacitor 50. The junction of the diode and capacitor is connected to the control grid of the amplifier tube 38. As a result, the tube is enabled to conduct, whereby the delay relay 36 is operated.

It should be noted that before delay relay 36 is operated, a negative potential is applied to the control grid of tube 38 to maintain it nonconductive. The circuit for this may be traced from a −25 volt source through normally closed contacts 36BL, 36B, through a potentiometer 52 and a series resistor 54. When relay 36 is operated, movable armature 36A closes on contact 36AU, thus preventing the application of voltage from the +25 volt source to the signal line. Contact 36B closes on contact 36BU, thereby removing the −25 volt potential source from being applied to the grid of the amplifier tube 38, through these contacts. It was previously indicated that armature 42 is ganged to be movable with an armature 56. In the normal position, armature 56 is closed on its lower contact 56L. In the operated position, armature 56 will close on its upper contact 56U. Since at the time noted for the delay relay operation motor control disc 30 has not yet traveled through 90° of arc, then the −25 volt source of potential is still connected over contacts 56L and 56 and 36BU and 36B to the control grid of tube 38. As a result, the charge on the capacitor 50 is discharged during an interval established by the value of the capacitor 50 and its discharging path, including the resistor 54 and the variable potentiometer 52.

As soon as relay 36 is operated, it opens up contacts 36D and 36DL, over which motor power is applied from the source 40 to the motor 26. The motor therefore stops and will not move any further until such time as condenser 50 is discharged. If at that time identification code pulses are still being transmitted on the signal line, condenser 50 will charge up again to operate relay 36 again. Potentiometer 52 can be given a value and setting to delay the operation of the motor for different intervals for each subscriber. As a result, should a purchase of a program be made approximately at the same time, the arrangement described provides a sequencing system whereby the code from each one of the purchasing subscribers is delayed in transmission to enable the use of a single line for receiving the purchase information from the various subscribers.

In the event that a code transmission has actually commenced by a subscriber and the space of such code transmission occurs in such a manner so that a second subscriber's program purchase has enabled the apparatus at his receiver to get to the position where code is commenced to be transmitted on the line, then for as long an interval as the two codes provide pulses identically both will continue to function. However, at some point one code will have a mark where the other has a space. The subscriber code source first having a mark will seize the signal line and the other subscriber code apparatus will be inactivated until the line clears for code transmission again. At this time, the other subscriber's code apparatus is recycled to transmit code.

For an explanation of the manner in which this is effectuated attention is again directed to FIGURE 2. By the time the code disc has commenced to transmit code, the motor-control disc 30 is rotated to a position at which it will cause the closure of armatures 42 and 56 to their respective upper contacts. Thereby, power to the motor is applied over contacts 42, 42U, and the motor will continue operating for the remainder of its operative cycle. Since relay 36 is operated at this time, no pulses are transmitted by the code disc 28, despite the fact it is actuating the armature 46. Armature 56 is closed to its upper contact 56U, thereby applying voltage from the +25 volt source to the capacitor 50. Thus, the amplifier 38 is maintained conductive and the relay 36 is maintained operative until the motor has rotated through a complete cycle.

Switch 44 of the buy-hold control disc 32 is opened at the termination of the operative cycle. However, in view of the fact that now-closed contacts 36C and 36CU bridge the contacts of switch 44, power is applied from the relay power source 22 to the relay 24 to maintain it operated. The armature 56 at the termination of an operative cycle will close to the contact 56L, thus removing the +25 volt potential from the capacitor 50. This capacitor will commence to discharge thereafter, and when it finally does discharge, if there are no other codes being transmitted on the signal line, the motor 26 will be energized anew to drive the three discs through another operative cycle. In the event that a code is still being transmitted at the time, capacitor 50 will be charged up again and the relay 36 will prevent the operation of the system until capacitor 50 can thereafter be discharged.

From what has been described, it will be seen that operation of the system is such that no two identification codes are transmitted on the line at the same time to provide confusion in recordation at the central recording office. The invention provides for lining up the purchase code transmissions, and in the event two codes have been commenced to be transmitted, the one which first provides a pulse when the other provides no pulse will take precedence. The other system will then wait until it can again seize the line.

There has been accordingly described and shown a novel, useful, and simple arrangement for transmitting a purchase or identification code on a single line joining many transmitters to a central recording office. Although the arrangement has been described in connection with subscription television, this is by way of illustration and is not to be construed as a limitation, since, effectively, there is provided a novel telemetering arrangement for collecting information from a plurality of different locations connected to a common line.

I claim:

1. In a subscription television system, a program-purchase indicating apparatus comprising a switch which is operated when it is desired to purchase a program, a motor, means responsive to operation of said switch to drive said motor through an operative cycle including a source of power for said motor, a delay relay, a normally closed pair of contacts for said delay relay, a buy relay having a normally open pair of contacts connected between said motor source of power and said normally closed pair of contacts, said normally closed pair of contacts being connected to said motor, means responsive to said switch being operated to close said normally open pair of contacts whereby said motor commences to rotate, a cam-operated switch having normally open contacts connected between said motor power source and said motor, disc means mounted to be rotated by said motor, the periphery of said disc being shaped and positioned to close said cam-operated switch contacts during an operative cycle once said motor has rotated a predetermined amount, a code disc coupled to be driven by said motor, a source of potential, said delay relay having a further pair of normally closed contacts one of which is connected to said source of potential, a signal output terminal, a diode, switch means responsive to said code disc to connect the other of said delay relay contacts or said diode to said signal output terminal, a capacitor connected in series with said diode, an amplifier connected to the junction of said diode and capacitor, means for coupling said amplifier to said delay relay to operate said relay when said amplifier is enabled, and a variable resistance coupled across said capacitor for establishing the discharge time of said capacitor.

2. In a subscription television system a program-purchase indicating apparatus for each subscriber comprising a buy switch which is operated when it is desired to purchase a program, a first relay operated responsive to operation of said buy switch, said relay having first and second pairs of normally open contacts, a second relay having a normally closed pair of contacts and a normally open pair of contacts, a first switch having a pair of normally closed contacts, a second switch having a pair of normally open contacts, a third switch having a pair of contacts and an armature movable therebetween, an output terminal connected to said third switch armature, a motor, a pair of motor-power applying terminals, means connecting one of said pair of terminals to said motor, said other of said pair of terminals being connected to said motor through the normally open contacts of said second switch and through said first relay second pair of normally open contacts and said second relay normally closed contacts, a first, second and third disc, means to support all said discs to be rotated by said motor, said first disc having elevations on its periphery in accordance with a subscriber identification code, means to support said third switch to operate its armature from a normally closed position with one of the pair of contacts to a closed position with the other of said pair of contacts responsive to the code elevations on said first disc periphery, said second disc having a portion of its periphery elevated, means for supporting said second switch to close its normally open contacts by the elevated portion of said second disc periphery, said third disc having an elevation surface at one portion of its periphery, means for supporting said first switch to have its normally closed contacts opened by said third disc elevation surface, means for applying power to said first relay through said first relay first pair of normally open contacts and said first switch normally closed contacts, means connecting said second relay normally open contacts in parallel with said first switch normally closed contacts, and means for operating said second relay in response to the application of a potential to said output terminal when said third switch pole is in its normally closed position with one of said contacts.

3. In a subscription television system as recited in claim 2 wherein said means for operating said second relay in response to the application of a potential to said output terminal when said third switch pole is in its normally closed position with one of said contacts includes a diode, a capacitor connected in series with said diode, a potentiometer connected across said capacitor, an amplifier connected between said diode and capacitor, and means connecting said second relay to said amplifier to be operated responsive to said amplifier being rendered conductive.

References Cited in the file of this patent

UNITED STATES PATENTS

| | | |
|---|---|---|
| 2,059,204 | Boswau | Nov. 3, 1936 |
| 2,088,002 | Scott | July 27, 1937 |
| 2,238,136 | Spencer | Apr. 15, 1941 |
| 2,289,746 | Bacon | July 14, 1942 |
| 2,398,594 | Muehter | Apr. 16, 1946 |
| 2,409,696 | Lewis | Oct. 22, 1946 |
| 2,567,018 | Grob | Sept. 4, 1951 |
| 2,731,622 | Doremus et al. | Jan. 17, 1956 |
| 2,731,635 | Walker | Jan. 17, 1956 |